Figure 10:
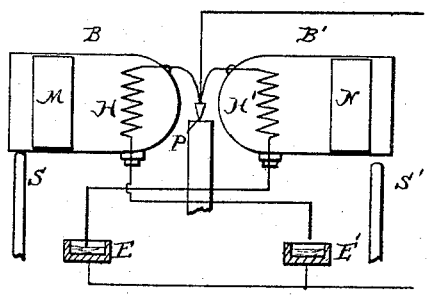

(No Model.)
E. THOMSON.
ELECTRIC METER.
No. 415,747. Patented Nov. 26, 1889.
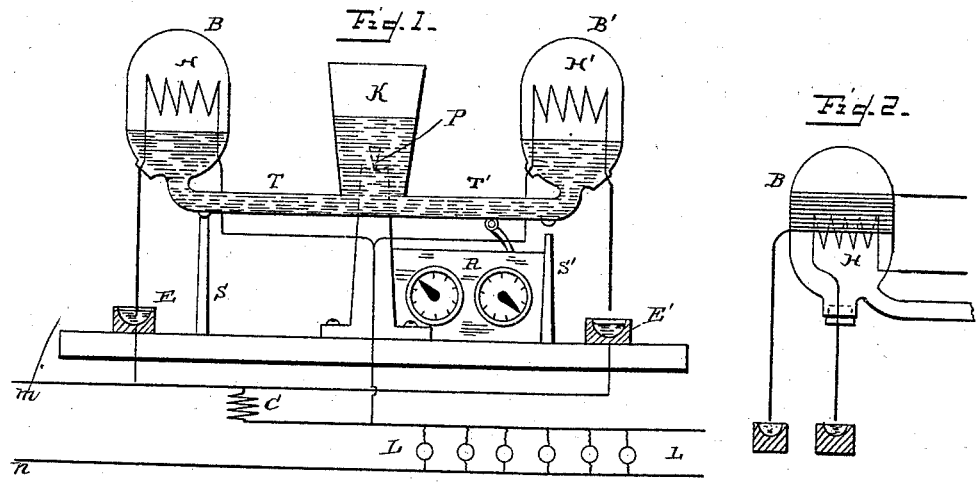
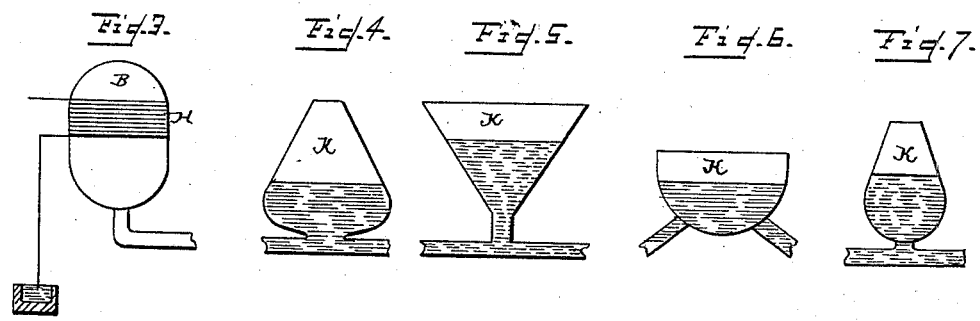
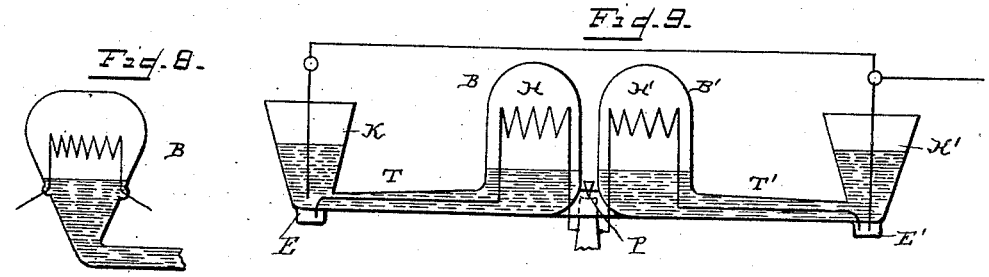
Witnesses
Ira R. Steward
H. H. Capel
Inventor
Elihu Thomson.
By his Attorney
H. C. Townsend (No Model.) 2 Sheets—Sheet 2.

E. THOMSON.
ELECTRIC METER.

No. 415,747. Patented Nov. 26, 1889.

Witnesses
Ira R. Steward
Wm. H. Capel

Inventor
Elihu Thomson
By his Attorney
H. C. Townsend.

N. PETERS, Photo-Lithographer, Washington, D. C.

UNITED STATES PATENT OFFICE.

ELIHU THOMSON, OF LYNN, MASSACHUSETTS.

ELECTRIC METER.

SPECIFICATION forming part of Letters Patent No. 415,747, dated November 26, 1889.

Application filed April 8, 1889. Serial No. 306,387. (No model.)

*To all whom it may concern:*

Be it known that I, ELIHU THOMSON, a citizen of the United States, and a resident of Lynn, in the county of Essex and State of Massachusetts, have invented certain new and useful Electric Meters, of which the following is a specification.

My invention relates to that class of electric meter or motor devices in which motion, oscillatory or rotary, is produced by the expansion of a body of expansible material—such, for instance, as a fluid, preferably a gas or vapor—which is put under tension by heat produced by an electric current, and which operates to shift a weight, so as to overbalance a pivoted structure. The weight shifted may be of any character, but is usually a body of liquid contained in a suitable chamber, forming a part of or mounted on a pivoted structure and exposed to the pressure of the expansible gas or other fluid. The liquid so shifted or moved may be of any character, and may even be a vaporizable liquid, in which case it may, through the heating action of the electric current, develop a vapor which, being confined in a space in the chamber or bulb above the liquid, shall, by its tension or expansive action when heated, act as the expansible fluid that shifts the weight consisting of the liquid itself. I ordinarily prefer, however, to use a non-vaporizable liquid as the shiftable weight and air as the expansible fluid or gas.

In this class of apparatus as heretofore constructed the shiftable weight has usually consisted of a body of liquid contained in a tube or receptacle opening at its ends into the vapor, fluid, or gas spaces of chambers or bulbs, the whole body of liquid being moved in first one direction and then the other by the pressure of one bulb and then the other. In other cases I have suggested the use of a single pivoted weight moved first by expansion in one bulb or chamber and then by that in the other.

My present invention consists, in the first place, in using a body of liquid as the shiftable weight and providing for the exposure of the said body to an air-pressure acting on the same in opposition to the pressure of the fluid or gas confined in a chamber by said body of fluid. By preference I use an oscillatory support or structure and in effect two shiftable bodies of liquid, because even where the receptacles for the liquid communicate there is an opportunity for the shifting of one body without movement of the other, owing to the fact that the point of juncture is a chamber open to the air and containing the liquid column, which, re-enforced by air-pressure, retains the expansible liquid or gas in the bulbs. There may, however, as will be hereinafter shown, be bodies of liquid not communicating with one another in any sense, the receptacles or tubes in which they move being entirely disconnected, but each open to air-pressure at the end opposite the end connecting with the bulb containing expansible air or gas.

My invention consists, also, in the provision of a separate shiftable oversetting weight on an oscillating structure for each of two chambers or bulbs containing expansible air, gas, or other fluid, such weights being moved separately and each in opposite directions by the expansible air or fluid and an independent opposing force—such, for instance, as air-pressure, although I do not limit myself to air-pressure as the opposing force; nor do I limit myself to a body of liquid as the separate or independent shiftable weights in the oscillating structure. In carrying out this part of my invention each expansible body of gas or fluid moves its weight in a direction opposite to that in which the other weight is moved, and the opposing influence being air, for instance, the expansible body may obviously act in each case independently of the influence of the other expansible body.

While I have hereinafter described the application of this part of my invention to motor or meter devices in which the motive force is the expansion or tension of a body of fluid, as gas, I do not limit myself to such application, the invention being applicable, so far as this part of it is concerned, to the case of any expansible body of any material when used as the motive force which moves the overbalancing or oversetting shiftable weight.

This part of my invention consists, essentially, in using upon the same oscillating structure two shiftable overbalancing-weights of any character moved in turn and in opposite directions by the expansion of suitable bodies expansible by heat and each acting on its weight against a suitable opposing force, not the force of the other expansible body—that is to say, an influence independent of such other body, but opposing the movement of the particular weight being shifted.

My invention likewise consists in providing a chamber or chambers for the confining liquid column of such dimensions that the elevation of the hydrostatic liquid column therein by the expansion of the expansible fluid or gas shall be less than the depression of the liquid column upon which such expansible air or gas rests, as will be more particularly hereinafter described.

Having described the general principles of my invention, I will proceed to describe the same with more particularity, referring to some of the forms of apparatus in which my invention may be embodied.

I shall for the sake of simplicity describe air only as the body of expansible fluid or the expansible body which acts on the shiftable weight, but do not limit myself thereto, and I shall describe the shiftable weight as a liquid simply because in some of its features my invention applies especially to liquids used as the shiftable weight, although in other respects the invention is realized in a structure having a shiftable weight of any kind or material.

Figure 11:
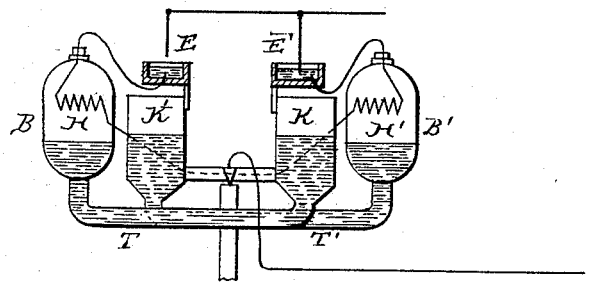
Figure 12:
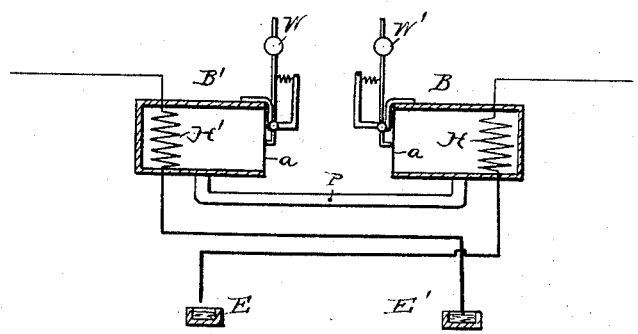

In the accompanying drawings, Figure 1 is a side elevation of a simple form of meter embodying my invention. Figs. 2 and 3 illustrate various ways of applying the electric heater. Figs. 4, 5, 6, and 7 illustrate modifications in the form of the open vessel in which a vertical column of the liquid is contained, and by means of which the vertical position of the center of gravity of the structure may be changed, as hereinafter described. Fig. 8 illustrates a modification in the form of the closed chamber for containing the heating-conductor, and by which form similar changes in the position of the center of gravity of the structure may be produced as the vertical column of the liquid in such chamber changes. Fig. 9 illustrates a modification in which the two shiftable bodies of liquid terminate in separate liquid columns exposed to air-pressure. Figs. 10 and 11 are elevations of modified forms of the meter. Fig. 12 illustrates another modification.

In Fig. 1, B B' are chambers or bulbs containing a confined volume of air or gas—confined in the sense that it is held by a liquid seal below and that the receptacles are partly filled with fluid, as shown. Applied to the receptacles B B' are electric heaters consisting of coils H H' or heating-conductors, which have a free terminal dipping into mercury-cups E E' alternately, so as to put into circuit either of the coils H H', according to the position of the system, the other terminals of the coils being connected in a common union.

The system is mounted upon a suitable pivot P a little below the center of gravity.

The shiftable weights consist of bodies of liquid contained in tubes T T', which bodies of liquid terminate at one end in chambers B B', respectively, as columns of liquid on which the bodies of expansible air in B B' rest, and at their other ends in an open chamber K as a hydrostatic column, upon which the pressure of the air is exerted to hold the liquid in its receptacle and confine the air in the bulbs. Suitable stops S S' limit the play or swing of the system on the pivot P from side to side, and a suitable register R may record the number of the swings or oscillations of the structure. It is adjusted so that the circuit of H is completed when the side carrying the liquid in tube connected to bulb B is the heavier or contains the most liquid, and the circuit of H' completed when the bulb B' is the heavier by the dipping of the wires into the mercury-cups E E' alternately.

When the apparatus is not in use, it should have its center of gravity slightly above the point of support P, so as to be in unstable equilibrium and tip readily from side to side. If a small current be now passed through, and if it finds contact at E, it will expand the air in B by heating the coil H, which is in circuit, driving the liquid over to the vessel K. The side of the structure bearing vessel B becomes practically lighter and the apparatus tips over, so as to close the circuit-coil H' of the bulb B'. The liquid is now expelled from B', which thus becomes lighter, while contraction takes place in B, thus permitting the fluid which was expelled a moment before to be driven back by atmospheric pressure. The system then undergoes a periodical oscillation, depending upon the strength of the current which reaches it. With an increase of current its oscillations may be far more than proportional to that increase on account of the fact that the heating of the conductor by the current is as the square of the current. To counteract or compensate for this, I cause the general heating of the vessels B B', which under the conditions just mentioned have a higher average temperature than before, to drive the liquid from both bulbs and raise its level in a vessel K of smaller section or capacity than the sum of the two bulbs in horizontal section, or, in other words, to cause an elevation of the hydrostatic column in K greater than the combined depression in the vessels B B' by the general expansion which the air in them undergoes with a higher average temperature. This can be controlled by the shapes given to the sides of the vessel K or its horizontal section at different heights, the effect of raising the liquid in K being to virtually cause the center of gravity of the structure to be raised or to overset the system and make it less sensitive to the heating effects which drive it from side to side. This is due to the fact that the weight which has to be lifted by the expanded air is greater the higher the level of the liquid in K at any time. Such condition of elevation of the center of gravity will obviously be produced unless the higher level in K is accompanied by a corresponding depression of the level of the liquid in the bulbs B B', thus lowering the center of gravity to the same extent as it is raised by the elevation occurring in K.

It must be understood that when both coils are alternately being heated and rather quickly, as when considerable current is passing, both will continue to increase in temperature up to a certain limit and will keep the air expanded permanently in both bulbs to a certain limit, while the transfer of liquid will then be made by the excess of heating over the cooling action, and the oscillations will be accomplished by the tendency to contraction and entrance of liquid when the current is off, assisted by the expanding action and depression of liquid in the other vessel where the current is on. Whatever conditions exist, however, the changes in the height of the liquid in the vessel K will act to give a compensation for every different current that is caused to circulate through the apparatus.

The manner of and the devices for feeding current through the meter are unimportant. The meter can be connected as a shunt around a resistance C or connected in any other way with the circuit-carrying current to be measured. When connected as shown, the current entering at $m$ will divide through C and through the meter, returning to $n$ through the lamps L L or other translating devices, one or more. The heating-coils H H' might be inside the bulbs or vessels B B', as shown, or be placed outside thereof, and the vessel be made of a very thin heat-conducting material; or two coils, one outside and the other inside, as shown in Fig. 2, might be employed, as described in another case filed by me April 8, 1889, Serial No. 306,388.

Fig. 3 shows a single heating-coil H, represented on the outside of the vessel B.

Fig. 4 shows a construction for the vessel K which causes a rapid increase in the overbalancing or lifting of the center of gravity as the liquid is driven from the vessels B B' by the expansion of air in them. The sides are shown as tapering upward, so as to narrow the column of liquid as it enters from below and fills the vessel K. Any equivalent way of narrowing the space for the liquid would suffice.

In Fig. 5 I have shown a vessel having the opposite shape—expanding from below upward; in Fig. 6, a bowl-shaped vessel K; in Fig. 7, a narrower vessel than Fig. 4, of the same general type. By suitable types of these vessels K various properties may be conferred on the measuring devices of the meter. Their sensitiveness to small currents or small loads may be increased at the expense of their sensitiveness to large currents or loads, or vice versa. It is obvious that similar effects might be obtained by properly shaping the portion of receptacle in which the hydrostatic column falls by the pressure of the air or gas, since, as will be obvious, the rate at which the column rises or falls in the receptacle K will depend upon the rate at which it is made to fall or rise in the bulbs B B'.

The structure Fig. 4 tends to the effect just mentioned by increasing the power necessary to overbalance as the current which passes through the apparatus for measurement increases, such increase of power necessarily rendering the apparatus less sensitive to tipping from side to side by slight changes of position of the liquid in the vessel. It is desirable that the apparatus be made of light material in order that these changes may have their full effect.

In Fig. 9 the chambers or bulbs B B' are shown as placed near together on each side of the pivotal point P of the structure. The receptacles or tubes T T' extend outward, respectively, in opposite directions away from the pivot to separate chambers K K', into which the liquid is forced, and in which the height of the hydrostatic column of such liquid rises when the heaters expand or put the contents of the bulbs B B' under tension. It will readily be understood that heating of the coil H will shift the liquid outward away from the fulcrum and cause it to rise in the vessel K, and that the heating of the coil H' will lift the liquid in the vessel K', at the same time lowering the level in the chamber B or B'. Simultaneously with the movement of either body of liquid, as described, the other will be moved inward toward the pivot by the air-pressure assisted by the liquid column in K or K', as the tension in the corresponding chamber B or B' diminishes when the heater is withdrawn from circuit. This changes the balance of the apparatus and causes it to swing from side to side as the coils H H' are inserted alternately in the path of the current. At the same time the relative areas or transverse horizontal section of the lower portion of the vessels B B', or that portion in which the liquid column decreases relatively to that portion of the vessels K K' which receive liquid and in which the hydrostatic column at the same time rises will govern the action as in the cases just described. The general operation is substantially the same as in Fig. 1, the only difference being that in Fig. 1 the expanding gas in one bulb helps to sustain the height of the hydrostatic column in vessel K, which acts to force a body of liquid back toward the other bulb. The switch-contacts in Fig. 9 are mercury-cups at the bottom of chambers K K'.

In Fig. 10 the vessels B B' are likewise mounted near the central pivot with their respective heating-coils H H', as before; but they are shown as taking the form of two cylinders with moving or solid pistons M N, which are the shiftable weights of the structure. These pistons may be hollow vessels sliding loosely within the cylindrical walls of the vessels B B', placed horizontally and packed by a mere film of oil or other liquid adhering and retained around the piston by capillary attraction. Any expansion of gas in the vessels B B' will move either piston M or N outwardly, and a contraction will cause them to be moved inwardly by air-pressure, thus causing a change in the center of gravity of the apparatus, and causing, when one piston moves outwardly at the same time that the other moves inwardly, a tipping or overbalancing from side to side between the stops S S'. In fact, the arrangement is like that shown in Fig. 9, with the exception of a solid piston or weight being used instead of a liquid piston or weight. The effects, however, of changing the horizontal section at different heights of the vessel which may be had in the apparatus Fig. 9 are not to be obtained in the apparatus Fig. 10. The swinging of the vessels B B', occurring as the piston M or N is forced away from the center, is positive on account of the fact that the center of gravity is above the point of support in the system or it is in unstable equilibrium, and the oscillatory movement causes a switching of the current from side to side or from H to H' and back again by means of mercury-cups at E E', so that a constant oscillation is kept up so long as a sufficient current is supplied to the system.

A further modification of what is shown in Fig. 9 is seen in Fig. 11, in which the two separate vessels with their cups K K' are arranged side by side and mounted together on a central pivot, the opening of the vessel K being only connected by a tube T at the lower part with B, and the other opening—that of the vessel K'—being only connected to the vessel B' at its lower part. The structure is, in fact, the same as if a separate chamber were used for each body of liquid in Fig. 1, and the tubes T and T' of such figure, instead of stopping at or near the pivot, were extended over toward the opposite side of the structure, so that each body of liquid would be partially shifted over from one side of the fulcrum to the other side.

Suitable sections or shapes are given to the vessels B and B' and K and K', as indicated in connection with the prior figures, for governing the position of the center of gravity of the apparatus under conditions of general temperature, which cause the expansion of gas in both vessels B and B'. The oscillations switch the current from side to side by mercury-cups E E' into the coil H of the vessel B or into the heating-coil H' of the vessel B'.

Various other modifications might be made, that shown in Fig. 11 being a type. It will be seen that the heating of the coil in the vessel B and the cooling of the coil in the vessel B' both act to produce a disturbance of the center of gravity in the same direction, since liquid is transferred from B to K at the same time that liquid is transferred from K' to B' by the actions just mentioned, giving a preponderance of weight to the structure on the right-hand side of the pivot P. Heating coil H' and cooling coil H cause expulsion of liquid from B' to K' and recession of liquid from K into the vessel B, throwing the weight over to the other side. These actions go on so long as the switching actions at the mercury-cups E E' continue.

Fig. 12 shows a modification of the instrument shown in Fig. 10. In Fig. 12 the shiftable weights at W W' are on pivoted levers, the short ends of which bear against expansible diaphragms $a$ $a$ in the sides of chambers B B', which are completely sealed by said diaphragms. As the heaters act the contained air or other fluid in the chambers expands, pushing out the diaphragm and shifting the weight so as to overset the structure. The switches are arranged as shown, so that when the structure has been tipped to one side the heater for the chamber at the other side shall be brought into action and the weight at the latter side of the structure moved back toward the oversetting portion. At the same time the weight at the side which has just acted will be moved in toward the fulcrum by air-pressure upon its diaphragm $a$ as the contents of the chamber cool, the movement being assisted, if desired, by delicate springs applied to the levers, as indicated. The diaphragm might be springy for the same purpose.

I do not claim herein the method of obtaining actions or effects proportional to an electric current, consisting in utilizing the heating effects to shift an overbalancing weight or weights, so as to raise the center of gravity of the structure, nor do I claim the hereinbefore-described method of determining the action of the meter under variations of load by giving a definite form to the hydrostatic column of the liquid, as these methods form the subject of another application for patent filed by me August 5, 1889, Serial No. 319,831.

What I claim as my invention is—

1. In an electric meter or motive device, the combination of an oscillating structure carrying two separate shiftable oversetting-weights and separate expansible bodies for each weight, said bodies acting on the weights separately in opposition to a suitable retracting influence independent of the other expansible body.

2. In an electric meter or motive device, a pivoted structure having a shiftable weight consisting of a body of liquid exposed on the one side to air-pressure and on the other to the action of an expansible fluid or gas capable of being put under tension by heat.

3. In an electric meter or motive device, the combination, in an oscillating structure, of separate shiftable oversetting-weights and separate chambers or bulbs for each weight, each such chamber or bulb containing an expansible fluid or gas acting on the weights, respectively, in opposite direction and each against an opposing influence independent of the opposition of the other.

4. In an oscillating structure substantially such as described, closed chambers or bulbs, each communicating with a body of liquid carried by the oscillating structure and shiftable independently of the body of liquid communicating with the other chamber, as and for the purpose described.

5. An oscillatory structure comprising two closed chambers or bulbs, each containing an expansible fluid and each sealed by a shiftable body of liquid terminating in a liquid column subject to atmospheric pressure, in combination with electric heaters for producing increase of tension of the fluid in said chambers, as and for the purpose described.

6. An electric meter or motive device comprising, in combination, two chambers or bulbs, each containing an expansible fluid—such, for instance, as air, gas, or vapor—and each sealed by a shiftable body of liquid borne by a pivoted structure and terminating in a liquid column subject to atmospheric pressure, electric heaters for increasing the tension of the body of fluid retained by the shiftable liquid body, and electric-switch devices for alternately connecting the heaters to an electric circuit.

7. The combination, substantially as described, of two chambers or bulbs containing air, gas, or other expansible fluid retained in the bulbs by a separate shiftable body of liquid for each chamber and all mounted together as an oscillating structure, an electric heater for each bulb or chamber, and electric-switch devices for throwing the heaters alternately into circuit, as and for the purpose described.

8. The combination, substantially as described, of two confined bodies of expansible fluid, a separate shiftable weight for each acted upon in one direction by said fluid and in the opposite direction by atmospheric pressure, said weights being mounted upon an oscillatory structure, an electric heater for each body of expansible fluid, and switch devices for throwing said heaters alternately into circuit.

9. The combination, substantially as described, of two chambers or bulbs containing expansible fluid, two shiftable bodies acted upon, respectively, by the fluid in said chambers in one direction and in the opposite direction by atmospheric pressure, an electric heater for each bulb, and switch devices for throwing said heaters alternately into circuit.

10. The combination, substantially as described, of two bulbs or chambers containing an expansible fluid—such as a gas—a body of liquid for each chamber, sealing the same and shiftable on an oscillatory structure under the influence of the pressure of such fluid and of atmospheric pressure operating in opposite directions, an electric heater for each chamber, and switch devices for throwing the heaters alternately into circuit.

11. The combination, substantially as described, of two chambers or bulbs, each containing an expansible fluid sealed by a body of liquid subjected to air-pressure and all mounted together as a pivoted structure, an electric heater for each bulb, and switch devices for subjecting said bulbs in turn to the heating effects of an electric current.

12. The combination, substantially as described, of two bulbs or chambers containing air or gas and mounted on a pivot, liquid-receptacles connected at one end to said chambers and containing a liquid exposed at the other end to air-pressure, an electric heater for each chamber, and switch devices for throwing the heaters alternately into circuit.

13. An oscillating structure carrying two shiftable liquid bodies terminating at one end in a closed chamber containing an expansible fluid and at the other end exposed to atmospheric pressure, electric heaters for increasing the tension of the fluid in said chambers, and switch devices for alternately connecting the heaters to a source of electric energy, as and for the purpose described.

14. The combination, in a pivoted structure having a shiftable liquid body, of a chamber or bulb containing an expansible fluid resting on a column of liquid and a counterbalancing column of said liquid in a chamber shaped as described, so that the rise in height of said column under the effect of the expansible fluid shall be less than the fall of the column on which said fluid rests.

15. The combination, substantially as described, of the two shiftable liquid bodies carried by a pivoted structure and each terminating at one point in a liquid column which bears an expansible gas or fluid and at an opposite point in a hydrostatic column or columns, the elevation of which latter, under the combined action of the expansible fluids, is greater than the combined depression of the columns upon which the expansible gas or fluid acts.

16. In an electric meter having a shiftable liquid body and electric heaters for causing such shifting, a vessel containing a vertical column of such liquid and having a shape which varies in cross-sections at different points in a vertical line at a rate or in a manner determined by the particular actions or effects desired in the meter under different loads.

Signed at Lynn, in the county of Essex and State of Massachusetts, this 1st day of April, A. D. 1889.

ELIHU THOMSON.

Witnesses:
J. W. GIBBONEY,
J. R. JOHNSON.